United States Patent [19]

Margrain et al.

[11] 3,805,104

[45] Apr. 16, 1974

[54] LOW INERTIA ROTOR FOR DYNAMO ELECTRIC MACHINES, AND METHOD OF MAKING THE SAME

[75] Inventors: Pierre Margrain; Gerard Lacroux, both of Malakoff, France

[73] Assignee: Etablissements E. Rajonot, Malakoff, France

[22] Filed: July 27, 1972

[21] Appl. No.: 275,565

Related U.S. Application Data

[62] Division of Ser. No. 52,595, July 6, 1970, Pat. No. 3,694,907.

[30] Foreign Application Priority Data

July 10, 1969  France .............................. 69.23496

[52] U.S. Cl. ................................. 310/266, 310/207
[51] Int. Cl. .............................................. H02k 1/22
[58] Field of Search ............ 310/266, 261, 202-207, 310/264, 67, 42, 43, 171, 45, 265, 49 A, DIG. 6

[56] References Cited

UNITED STATES PATENTS

| 2,759,116 | 8/1956 | Glass ................................. 310/266 |
| 3,001,117 | 9/1961 | Sikorra ............................... 310/171 |
| 2,940,038 | 6/1960 | Probert .............................. 310/171 |
| 3,312,846 | 4/1967 | Henry-Baudot .................... 310/266 |
| 3,623,220 | 11/1971 | Chase ................................ 310/266 |
| 3,487,246 | 12/1969 | Long .................................. 310/266 |
| 3,324,323 | 6/1967 | Henry-Baudot .................... 310/266 |
| 3,093,762 | 6/1963 | Henry-Baudot .................... 310/49 A |
| 3,532,916 | 10/1970 | Fisher ................................ 310/266 |
| 3,209,187 | 9/1965 | Angele ............................... 310/266 |

*Primary Examiner*—R. Skudy
*Attorney, Agent, or Firm*—Flynn & Frishauf

[57] ABSTRACT

A hollow insulating cylinder with conductors thereon is placed over an internal metallic tubular support which is supported by an end disk at one end, and open at the other, the open end being flared for stiffness.

12 Claims, 13 Drawing Figures

LOW INERTIA ROTOR FOR DYNAMO ELECTRIC MACHINES, AND METHOD OF MAKING THE SAME

The present application is a division of Ser. No. 52,595, filed July 6, 1970, now patent 3,694,907.

The present invention relates to rotors for dynamo electric machines, and more particularly to low-inertia rotors utilizing printed, or laminated circuit techniques in their manufacture.

Servo and control motors, particularly motors used in data processing equipment require rotating elements which have as low an inertia as possible, so that they can rapidly reach a stable commanded speed from rest, or from any other speed. Such motors are also needed to control tapes, particularly for tape transport in computer equipment which have high start-stop requirements with extremely low inertia.

Various types of motors with low inertia have been developed. A particularly useful type employs a rotor formed as a hollow cylinder which rotates within an air gap of a magnetic circuit which is fixed. The winding of the rotor is formed of coils having a single loop formed as printed or laminated circuits. Laminated circuits should be understood to mean circuits in which conductive strips are applied to an insulating support base, for example, by adhesives, crimping or other methods known in the art.

Rotors of the type forming a hollow cylinder are usually made by first preparing an outline, that is a printed (or laminated) drawing of the windings as a printed circuit and carrying the conductors for current flowing in one direction and then the return conductors. The two outline drawings, first flat, are then placed over another, rolled in cylindrical form, and then interconnected at their terminal ends in order to form the loops of the windings. This method of assembling requires two interconnections; one at the rear face, where the forward and the return current carrying windings are interconnected and the other on the forward end, which may also be called the "collector end." Difficulties have been experienced in making the connections, particularly in making the connections at the back end where the windings are to be interconnected, which difficulties have been solved only by manually interconnecting one conductor after the other in the region of their junctions.

It is an object of the present invention to provide a rotor of low inertia, in which the windings are formed by printed or laminated circuits techniques.

SUBJECT MATTER OF THE PRESENT INVENTION

Briefly, a hollow metal support cylinder of a metal having a high conductivity, such as nickel is used, the cylinder being thin (about 0.25 to 0.3 mm thick) on which an insulating material is applied, and electrical conductors are placed on the insulating material, the electrical conductors being in printed or laminated circuit form. In a preferred form, the conductors are applied to a thin soft support foil, such as "Mylar" having a thickness in the order of tens of microns, which is rolled over the metal support cylinder.

A hollow support cylinder may be made by electrolytic deposition about a mandrel which is later removed. The mandrel itself may consist of a central core of tough material surrounded by a metallic covering material having a low melting point which is readily melted out.

IN THE ACCOMPANYING DRAWINGS

Figure 4:
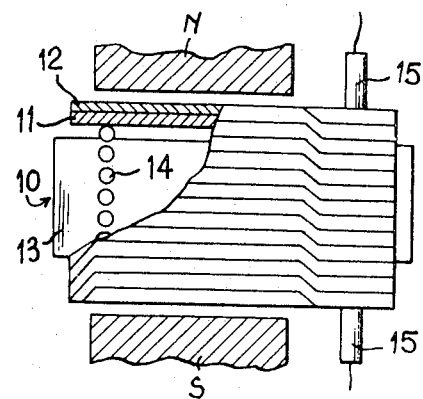
FIG. 4 is a longitudinal, partly broken away and crossectional view of a rotor assembled in a machine, shown in schematic form.

The type of rotor to which the present invention relates is best seen in FIG. 4. The hollow cylinder 11 has coil windings 12 mounted thereon. An air gap is formed between two magnets generally, schematically indicated as N and S and a central core 13. A bearing such as balls 14 within a bearing race, not shown, provides for rotation of the rotor assembly 10 consisting of the cylinder 11 and windings 12, with respect to core 13. A pair of brushes 15 run on a commutator, the elements of which may be formed by straight terminal portions of the conductor forming the winding.

The armature 12 is of the type generally known as "interlaced" and is formed of individual winding units, each one of one or more layers. since the winding arrangement itself is well known, it will not be described again in detail but a brief review will be given of the winding lay-out to define the type of armature described in detail.

Figure 1:
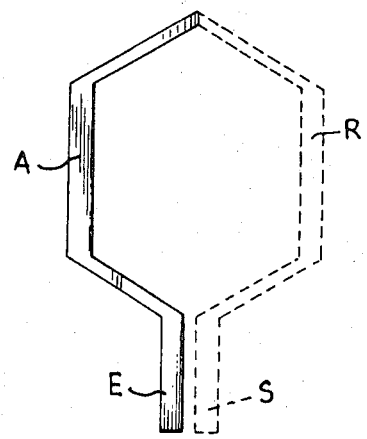
FIG. 1 illustrates a plan developed view of a complete loop of a winding for the rotor of a dynamo electric machine.

FIG. 1 illustrates a coil formed of a single winding. In this winding, a "going" conductor A (shown in full lines) is connected to a straight input portion E. It is connected by means of a rear bridge to a "return" conductor R shown in broken lines, having a straight output terminal portion S. For purposes of further description, the input and output portions E, S will be termed "the foward" portion and the interconnecting bridge "the rearward" portion of the winding.

A number of identical coils are arranged, all around the rotor overlapping one above the other in such a manner that the forward, or "going" conductors all are located next to each other in the longitudinal sense of the rotor, however, in two layers, only one of which is formed by the going conductors A. The second layer is formed by the return conductors R. The input connection of each coil which is on one of the layers is connected to the output of an adjacent coil of the other layer, thus, giving a complete endless winding closed in itself, and generally termed an interlace wound armature. This type of armature is selected as an example, although the invention is applicable to any kind of armatures, particularly to those in which the conductors have two layers.

Figure 2:
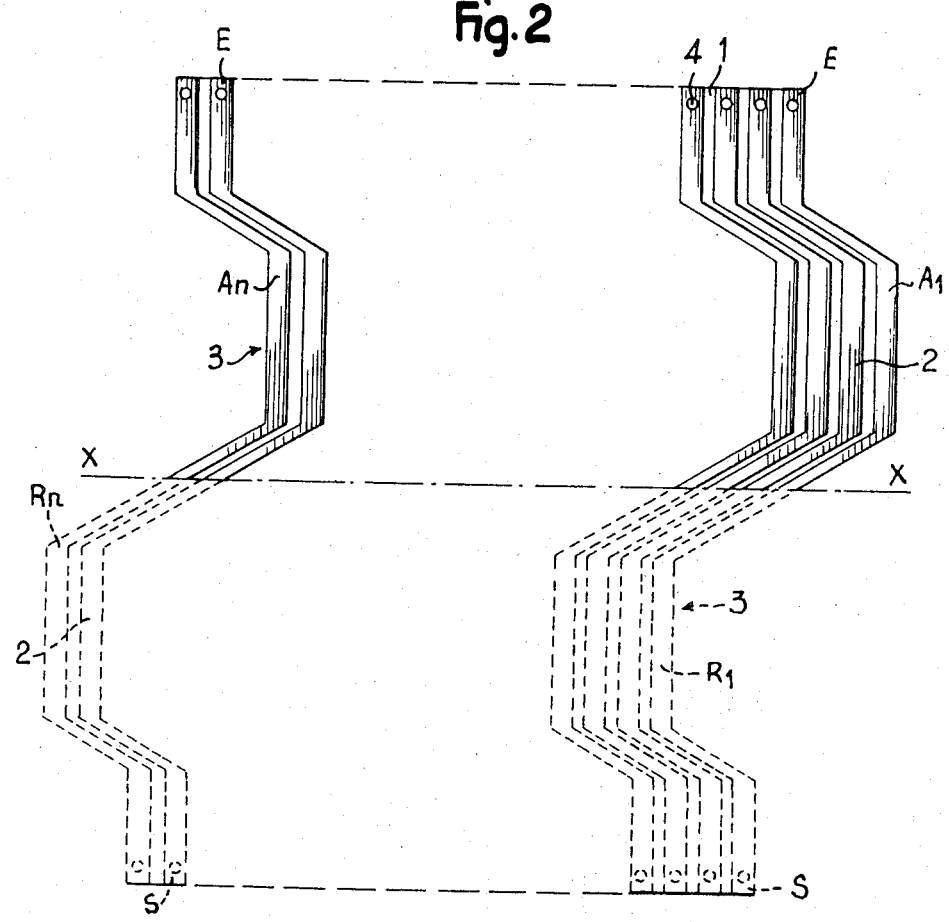
FIG. 2 is a developed plan view of the outline shape of a printed or laminated surface, with some conductors thereon, forming one embodiment of a starting point in making the rotor in accordance with the present invention.

In accordance with the present invention, the outline of the armature 12 is first provided on a flat sheet of printed circuit such as shown in FIG. 2. The carrier for the printed circuit is a thin, flexible sheet material having a conductive surface applied to one side, for example, copper. The copper may be in sheet form printed, or laminated thereto. It is engraved in accordance with the image of the entire winding to be applied, that is the terminal end portions E, the going conductor A, the connecting bridge at the back of the armature, the return conductor R and the final terminal portion S. A group of forward conductors $A1 \ldots A_n$ as well as the return conductors $R1 \ldots R_n$ of armature 12, when developed and in plan view, will appear as shown in FIG. 2. Taking the axis X—X of this representation as a hinge point, and doubling over the broken line portion, one obtains a flat sheet of two superimposed layers, which form the conductors. It is readily seen that the array of conductors forms a family of zig-zag, parallel tracks, the array of one side of the hinge X-X having the same longitudinal dimension as the other portion, but at opposite sense of curvature, with respect to the left-right direction of FIG. 2. Each one of these tracks will then represent a going conductor and a return conductor, respectively, of the armature and thus, form one winding of armature 12.

Figure 3:
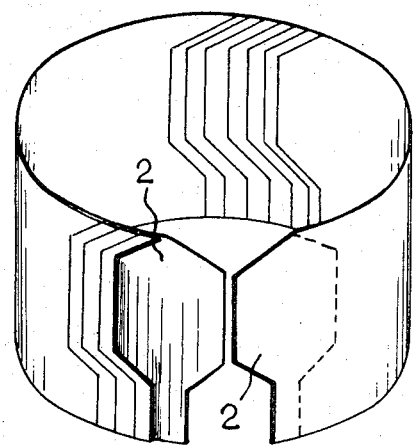
FIG. 3 illustrates an almost completed rotor in perspective view.

In order to form a cylindrical armature, by means of the circuit assembly of FIG. 2, end portions of the insulating support 1 are cut to match the outlines of the first and last of the conductors Al-Rl and $An-R_n$. Thereafter, the flat sheet is folded along hinge X—X so that the insulating sheet will be at the interior of the fold. The insulating sheets can then be adhered together, and the flat, folded form is rolled by hand or over a cylindrical mandrel into form of a cylinder in which the first conductors Al-Rl will be along side with the respective last conductors $An-Rn$. FIG. 3 illustrates, that due to the curvature in the cylinder, several of the "going" conductors A will define the projecting portion 2, wherein those of the return legs Rl . . . will define a hollow or indented portion 3, inverse to the projecting region 2. The last going conductors $An$ . . . as well as the return conductors $Rn$ . . . will be, with respect to the first ones, reversely indented or projecting. When the first and the last conductors are juxtaposed, the projections 2 will match exactly within the indentations 3 and can be placed above the other. Since the insulating face of the carrier having the original design is folded interiorly, the projection 2 will be placed insulation, against insulation and, upon adhering together the entire assembly into a closed cylinder, the circuit of FIG. 2 is transformed into hollow cylinder having practically no trace at the junction. The exterior face of the cylinder will support one of the layers of conductors, for example, the going conductors, whereas the interior face will support the other layer of conductors, that is the return conductors. The two layers are thus, naturally insulated from the other. There is no interruption between going and return conductors of any one winding. Nevertheless, the winding terminals are free at the collector side. An input terminal of each winding is opposite the output terminal of an adjacent winding, in a suitable position for their interconnection. A simple way to interconnect the terminal strips electrically consist in forming a small opening 4 in the printed or lamina circuit, and then filling these holes with a small plug of connecting metal, such as tin which can be obtained by dipping the terminal ends in a solder bath, or placing a small grain of copper through the holes providing for adhesion, for example, by compression, heating or other suitable methods. The holes 4 may be pierced in the circuit in flat form, at the same time when the circuit outline is engraved or otherwise manufactured. In general it is not necessary to provide a special connecting element of the windings of armature assembly 12 to a separate collector, since the straight conductive portions which form the input and output terminals E, S, respectively, may directly serve as the tongues of the collector (see FIG. 4).

Armature 12 as described, utilizes a support for the printed circuit which is thin and plyable and which can be readily bent, as well as being rolled in cylindrical form. It may, for example, be a sheet of polyester, Mylar or the like of several tens of microns in thickness. The copper sheet on the support may have any desired thickness, depending on the current carrying capacity required of the armature 12 and by the width of the air gap in which the armature 12 is to operate. In order to utilize the terminal ends of the windings as the collector tongues, the thickness of the terminal ends can be increased by electrolysis at the point where the brushes will track, particularly when the thickness of the copper conductors forming the winding is very small, such as several microns only.

Figure 5:
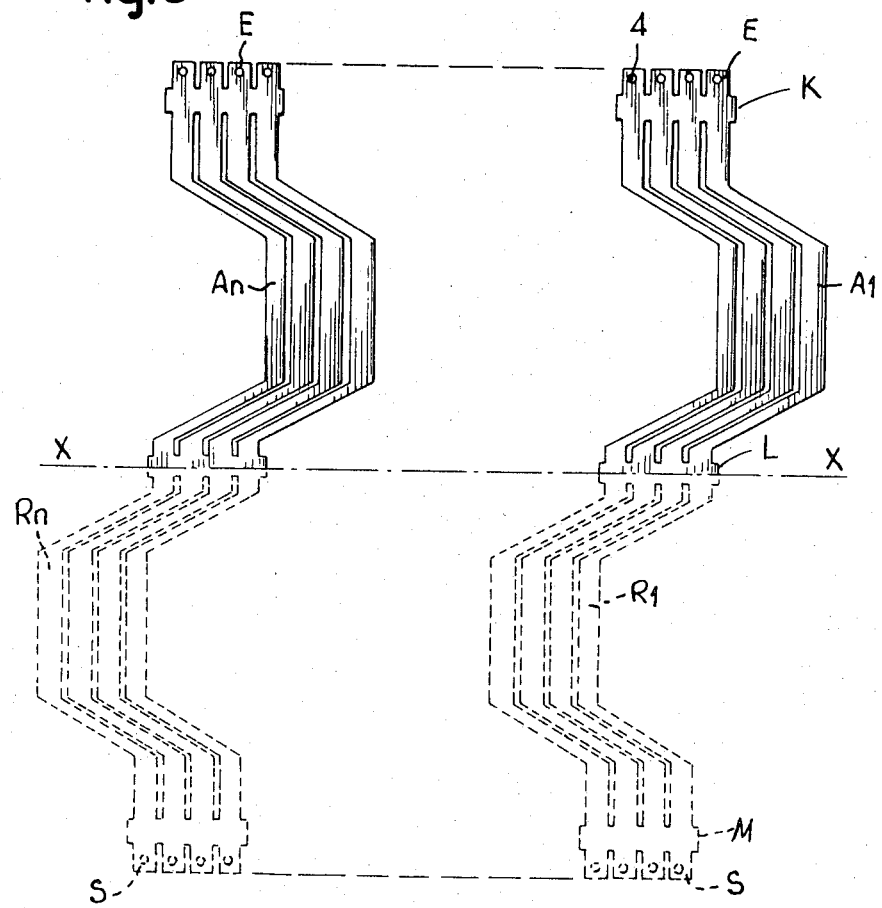
FIG. 5 is a top plan view of the lay-out of the windings in accordance with a different embodiment.

Embodiment of FIG. 5: The outline of the armature 12 is cut flat from a single sheet of metal, such as copper. Conductors Al. . and Rl . . have the same general form as that shown in FIG. 2; they are interconnected together by small metal tabs, KLM located conveniently and preferably at the terminal end regions E, S, respectively, as well as at the level of the hinge X—X. The interconnection of the conductors among each other prevents deformation and spreading apart; interconnection at three points permits ready handling of the cut sheet of copper. In order to form the armature by means of a copper sheet, it is folded in half along the hinge X—X, and bent round over a cylindrical mandrel, or directly over a hollow cylinder 11. After being shaped, a thin insulating tube is placed in the interior of the fold, that is between the layers of going conductors A and the return conductor R. Thereafter, input and output conductors are interconnected, and then the small tabs K, L, M are cut to sever the conductors both at the collector end, as well as at the rear end of the armature.

In accordance with a variation, the sheet of copper is cut and adhered to an insulating, flexible sheet before being bent, and then bent along hinge axis X—X and shaped as before.

Figure 12:
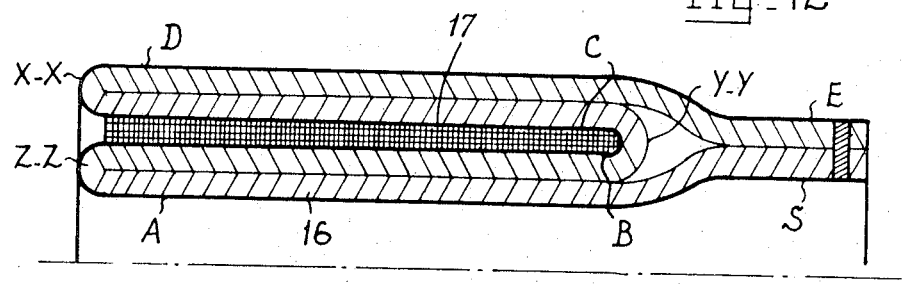
FIG. 12 is a partial longitudinal cross-sectional view of one multilayer winding, after folding of the circuit of FIG. 11.
Figure 11:
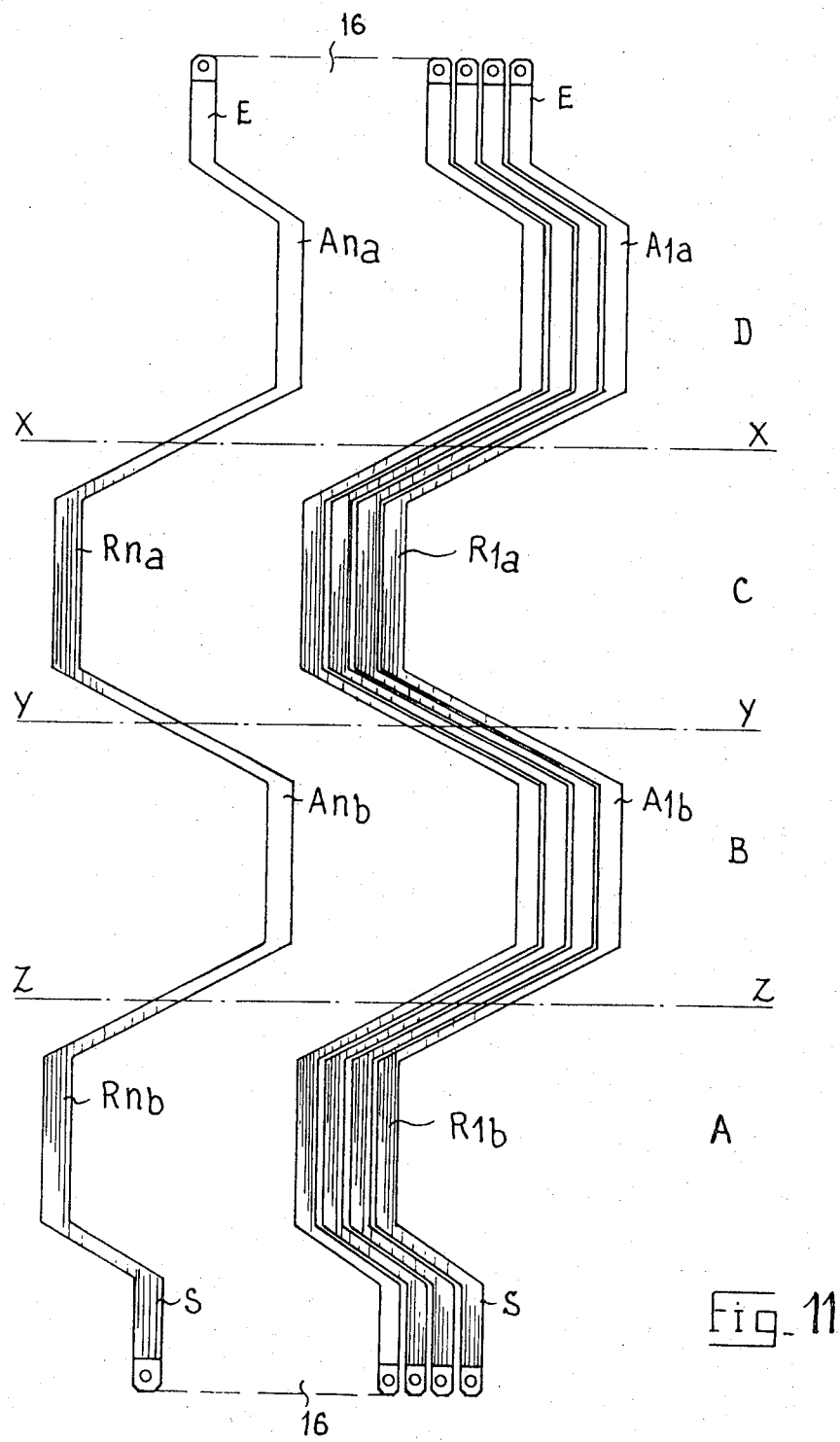
FIG. 11 is a lay-out drawing for a multilayer winding.

Embodiment of FIGS. 11 and 12: To make a multi-layer armature 12, flat winding outline in accordance with FIG. 11 is prepared again as a printed circuit similar to the embodiment of FIG. 2, with interconnected groups of conductors as described in connection with FIG. 5. A plurality of going and return conductors will be provided; as seen in FIG. 11, the going conductors $A_{la}$-$A_{na}$ are connected to return conductors $R_{la} \ldots R_{na}$ to going conductors of the second layer $A_{lb} \ldots A_{nb}$ and in turn to the return conductors of the second layer $R_{lb} \ldots R_{na}$. As first fold, the conductors are then hinged about axes X—X and Z—Z to form the going and return conductors of the two layers with supporting insulating material 16 therebetween, similar to the insulating material 1 of FIG. 2, or, if the conductors are made of interconnected strips of copper, for example, a sheet insulating material can be interposed to separate the going and return conductors. Thereafter, a bend in the opposite direction is formed above hinge axis Y-Y with an insulating sheet 17 (FIG. 12) therebetween. The array of conductors forms as group of tracks in zig-zag parallel arrangement. Each one of the conductive tracks represents going and return conductors of a coil having two windings. Only the going conductors of the first winding, $A_{la}...A_{na}$ and the return conductors of the last winding $R_{lb}...R_{nb}$ have terminal ends which are straight in order to form the input and output portions E, S of the coils. Input E may, directly, form also the commutator segments.

Figure 13:
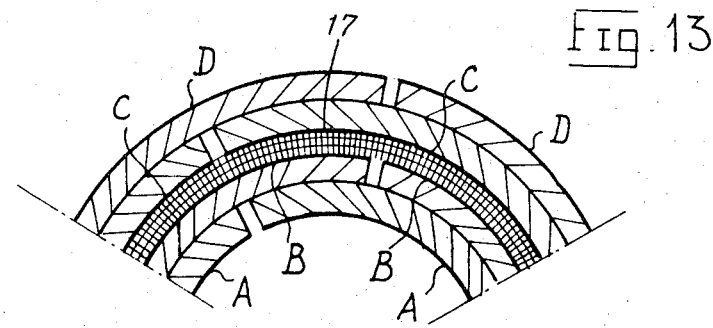
FIG. 13 is a partial transverse cross-sectional view of the coil of FIG. 12 showing how the conductor layers, among each other are interconnected.

The embodiment of FIG. 11 is similar to that of FIG. 2, except that it has two windings. Similarly, insulating support film 16 is cut in accordance with the outline of the terminal conductors $A_{la}$ - $R_{la}$ - $A_{lb}$ - $R_{lb\ l\ and\ Ana}$ - $R_{na}$ - $A_{nb}$ - $R_{nb}$. The outline pattern, just cut, may then be folded along hinge Y—Y with the conductors facing each other (that is the insulating sheet at the outside), and the insulating sheet 17 is interposed and the layers of windings are then adhered together (see FIG. 12). The pattern is folded back upon itself upon axes X—X and Z—Z. The going conductors of the second layer $A_{lb} \ldots A_{nb}$ and the return conductors of the first layer $R_{la} \ldots R_{na}$ are thus separated by the insulating sheet 17. After adhesion together of all insulating sheets, various layers of the conductors will be superposed as illustrated in FIG. 12. The entire assembly folded and adhered together is then rolled in the form of a cylinder, ends are covered as best seen in FIG. 13 and fixed by adhesives.

Armatures having a larger number of winding layers than two may be made in similar fashion. The embodiment described in connection with FIGS. 11 and 12, shows the winding layers folded along fold hinge lines, with insulating sheets interposed between adjacent layers of conductors. Insulating sheets may be either the support for the conductors themselves or may be separate sheets similar to sheet 17, inserted flat and in tubular form after the winding arrangement has been rolled into a cylinder.

The armature sub-assembly 12 in accordance with the invention is mounted on a hollow cylinder 11 (FIG. 4) to form the low inertia rotor assembly 10.

The hollow cylinder 11, in accordance with the invention, must be very light so that its inertia does not substantially increase that of the armature assembly. It must be sufficiently thin to take up little space in the air gap and, additionally, must be sufficiently rigid to retain a circular shape. Cylinder 11 is of metal and the exterior surface thereof is protected by an insulator. In case good heat removal from the armature is desired, cylinder 11 may also be made of beryllium oxide, a ceramic having a heat conductivity which is almost equal to that of copper. The metal cylinder should, preferably, have one or several of the following characteristics: It should be capable of being applied by electro deposition in a thin layer having low internal tension, that is less than 100kg. per square cm. For example; it should have good mechanical strength, that is, be very rigid, resistant to compressive forces, and have a high young modulus, while having a low volumetric mass; and it should have a high electrical resistivity so that the rotor, in operation, will have little eddy current losses.

A suitable metal is nickel. A hollow metallic cylinder 11, made of nickel, can be made in accordance with the present invention and as claimed in parent application Ser. 052,595 now U.S. Pat. No. 3,694,907, as follows (with reference to FIG. 6); a layer 19 is electro-deposited in a nickel sulfamate bath or a similar bath. Layer 19 will have a homogeneous thickness in the order of from 0.25 to 0.30 mm. applied on a tough cylindrical core 18, such as soft iron. Core 18 has a cylindrical body 20 and a coaxial cylindrical extension 21 which functions as mechanical axis first for the entire core 18 during the manufacture of the hollow cylinder 11, and then may function as a shaft for the hollow cylinder 11.

Figure 7:
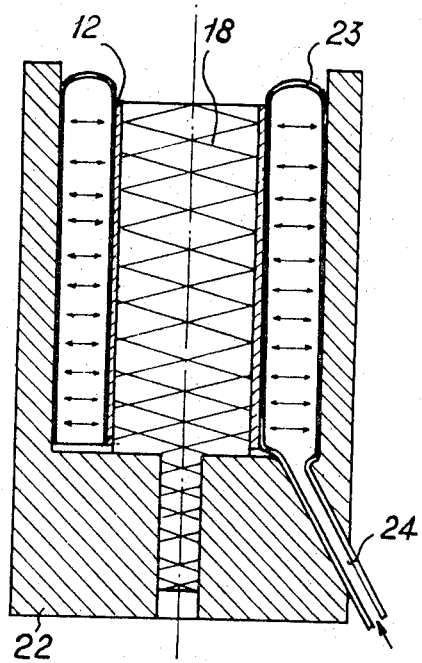
FIG. 7 is a schematic longitudinal view through a pressure chamber illustrating a step in the process of manufacturing a complete rotor.

Core 18, with its exterior layer 19 of nickel is carefully machined for roundness. Nickel layer 19 on core 18 is covered with adhesives and insulating resin 19' and then the armature 12, previously folded, is rolled thereon. The super-imposed layers of the armature are adhered together. The armature itself may be formed as previously discussed in connection with FIGS. 2, 5, or 11. After adhering the end portion of the winding array of armature 12, the entire sub-assembly of core-nickel coating — winding is located in a pressure chamber 22 (FIG. 7) in which an internally hollow pressure bladder 23 is inserted. Pressure bladder 23 is inflated through a duct 24 to apply itself snuggly against the outside of the sub-assembly armature 12 — layer 19 — core 18, to remain there for at least a part of the period of time of polymerization of the adhesive resin, or during another adhesion process. Heat may be supplied if desired.

The sub-assembly: Core 18 — layer 19 (with applied insulation 19')—armature 12 is then removed from the pressure chamber 22 and machined to remove almost, or all of the cylindrical material 20 of core 18 (FIG. 8) leaving, however, the nickel layer 19 in tact. This may be accomplished by means of mechanical machining, finished by chemical attack. Nickel layer 19 and the remaining portions of core 18 (FIG. 8) will then form the hollow cylinder 11 illustrated in FIG. 4 and referred to in the preceding description.

Figure 6:
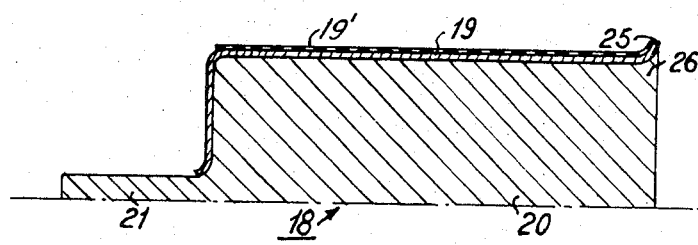
FIG. 6 is a partial schematic cross-sectional view, in longitudinal section, of the hollow metal cylinder being applied to a mandrel which has not yet been removed.
Figure 8:
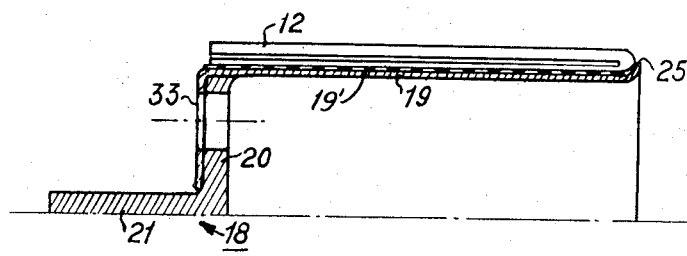
FIG. 8 is a partial longitudinal cross-sectional view, in section, of an assembly of a support cylinder and winding after the process of FIG. 7 has terminated.
Figure 10:
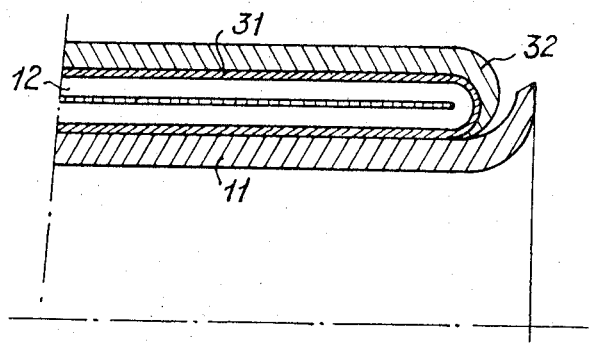
FIG. 10 is a partial cross-sectional longitudinal view to a greatly enlarged scale of a rotor of FIG. 4, which is banded with a metal band.

For improved rigidity, the nickel layer 19 may be formed with a bulged up cylindrical edge 25 (FIGS. 6 and 8). The core 18 itself may already be formed with an enlarged end portion 26 (FIG. 6) to effect deposition in the shape shown to an enlarged scale in FIG. 10.

Figure 9:
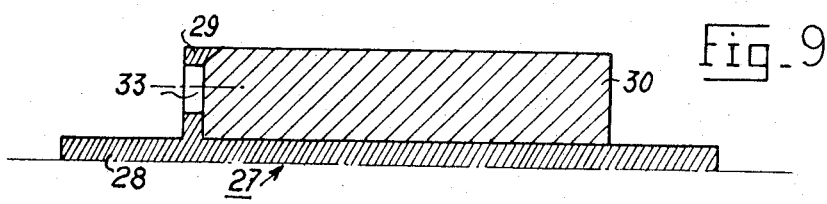
FIG. 9 is a schematic longitudinal half cross-sectional view of a core and mandrel in accordance wth another embodiment of the present invention.

In accordance with the present invention, the core in which the hollow cylinder will be obtained may be similar to core 27 (FIG. 9) which is partially composed of tough metal and partially a metal having a low melting point, in order to facilitate removal of the cylindrical body which is not necessary, after the layer 19 of nickel, or another metal of suitable characteristics, has been applied on the core. Core 27 has a central shaft 28 and disc-like end portion 29, also of tough metal, as well as a cylindrical body of low-melting point metal, or alloy; a melting temperature of from 100° to 130°C. in suitable.

After the roundness of the core 27 is accurately established, it is first covered with a thin layer of copper, for example, by electrodeposition, and then covered by a layer 19 of another metal such as nickel. Nickel layer 19 has the armature 12 applied thereto as described previously. The sub-assembly: Nickel-covered core 27, and insulation 19'; and armature 12 is then if desired, inserted in the pressure chamber (FIG. 7); to remove the metal, it is subjected to a temperature just above the melting point of the metal, or the metal alloy forming the cylindrical body 30. The metal forming body 30 is carved out, leaving intact the layer 19 of nickel with an internal thin film of copper. Any residual low-melting point metal is removed by machining. The copper base film forming the plating substrate may either remain, or may be removed chemically.

Rotors 10 which are to operate at high speed preferably are banded on the outside. In accordance with the invention, and exterior insulating layer 31 covers the conductor of armature 12, which for mechanical strength may be metalized in accordance with electrodeposition techniques, for example, by a thin layer 32 of a metal such as nickel (see FIG. 10). In order to make the rotor as light a possible, relief holes 33 (FIG. 8 and FIG. 9) may be pierced through the end faces.

As had been seen, the motor is easily manufactured from a flat, plain sheet. The lay-out of the conductive strips to form the windings may be carried out by well known printed circuits or laminated circuit techniques on a flat surface, which are then folded as desired. Contrary to the prior art, which requires separate manufacture of going and return conductors, and interconnection of the windings both at the commutator end as well as at the rear end of the armature, the present invention provides a rotor structure and a method of making such a rotor in which the number of parts to be handled and to be made is decreased, thus, substantially facilitating alignment and interconnection of the separate parts. The only interconnection to be made is the collector side. In accordance with the invention, the two terminal conductors of the armature assembly, when rolled in a cylinder, match exactly without necessity of providing interconnection of the conductors of the windings, one each, thus omitting additional connection points and simplifying manufacture and assembly.

The winding 12 can be applied directly over the hollow cylinder 11, if this hollow cylinder 11 is covered with a thin layer of electrically insulating material before the winding 12 is applied thereover. After applying an insulating layer over the hollow cylinder 11, a thin and uniform metal coating is applied over the insulator on which a conductor of the winding 12 are then formed in accordance with known processes. If the winding 12 is to contain a plurality of superimposed layers, the portions described above may be repeated several times, that is, after forming the conductors of winding 12 a thin insulating layer is applied thereover, then a metal coating on which the second winding layer is formed, and so on. Since the formation of this winding is carried out in accordance with known processes, they are not described or shown in detail. The windings so obtained may be secured by a binding or hoop, as described above.

The present invention has been described specifically in connection with single and multi-layer windings armatures having interlaced windings; other winding systems, and different winding arrangement may be used within the scope of the inventive concept.

We claim:

1. Low inertia rotor structure for dynamo electric machines having discrete conductors forming at least one winding loop thereon comprising
   a thin, hollow support cylinder made of metal (11, 19), said metal support cylinder being open at one end and having an outwardly flaring end section (25) at said open end;
   a metal end support disk (20), secured to and supporting the thin metal cylinder at the other end thereof and providing a connection to a shaft (21);

a layer of insulating material (19') in cylindrical form surrounding the outside of said metal cylinder (11, 19); and an array of adjacently located conductive strips forming an entire winding loop on said insulating material located on the metal cylinder.

2. Rotor according to claim 1 comprising a support sheet of insulating material rolled in cylindrical form and carrying said conductive strips secured thereto, said array comprising
   axially extending conductor sections interconnected by integral conductive sections extending essentially circumferentially and folded about said insulating support sheet, said insulating support sheet separating the axially extending conductor sections of any one conductor applied to the sheet from the other, superposed axially extending conductor sections of the array.

3. Rotor according to claim 2, wherein the conductor sections are applied as unitary conductive bands to one side of an insulating support sheet, said sheet having a fold line (X—X) thereon;
   and the sheet of insulating material is folded hinge-like around said fold line against itself with the side free from conductors at the inside of the fold, said folded sides of said sheet being adhered together.

4. Rotor according to claim 1 wherein the insulating material comprises an insulating support sheet which is soft and has a thickness in the order of tens of microns, rolled in cylindrical form, and placed on the metal cylinder, and the conductive strips are located on the support sheet.

5. Rotor according to claim 4, wherein the insulating support sheet is a polyester.

6. Rotor according to claim 2, wherein the conductive strips are metal bands;
   removable sections (KLM) are provided between said strips, said strips being folded toward each other in the region of said circumferential sections; said support sheet being a hollow cylinder of insulating material, and said removable severing sections are removed prior to assembly of the rotor into a dynamo-electric machine.

7. Rotor according to claim 1 wherein the insulating material comprises a rolled, longitudinal sheet of insulating material with said conductive strips secured thereto and located on the support cylinder (11, 19) with the insulating material contacting the outside of the metallic support cylinder.

8. Rotor according to claim 1, wherein said thin hollow cylinder is of nickel.

9. Rotor according to claim 1 wherein said hollow metal support cylinder has a thickness of about 0.25 to 0.3 mm.

10. Rotor according to claim 2 comprising a plurality of winding layers each including integral conductive strips; said conductive strips being folded in zig-zag form;

and cylindrical sheets of insulating material (17) separating, facing conductive strips forming portions of the winding loop to insulate said portion from each other.

11. Rotor according to claim 2, wherein said sheet material having said conductive strips thereon, when rolled into cylindrical form, has an overlapping seam;

said sheet being shaped to conform to the outline of the first and last conductor;

and the overlapping portion of the sheet forming the seam with conductors thereon being adhered together with the conductor section forming a continuous circumferential array, the first and last conductors fitting uniformly against each other, with insulating sheet material therebetween, and without break in the continuous uniformity of spacing of the axially extending conductor sections.

12. Rotor according to claim 1, wherein the hollow metal support cylinder is of about 0.25 to 0.3 mm thick nickel.

* * * * *